United States Patent
Ocheltree

[11] Patent Number: 5,241,540
[45] Date of Patent: Aug. 31, 1993

[54] REVERSE ORDERED CONTROL INFORMATION TRANSMISSION

[75] Inventor: Kenneth B. Ocheltree, Ossining, N.Y.

[73] Assignee: International Business Machines Corporation, Armonk, N.Y.

[21] Appl. No.: 739,124

[22] Filed: Jul. 31, 1991

[51] Int. Cl.[5] .............................................. H04J 3/00
[52] U.S. Cl. .................... 370/85.12; 370/85.14; 370/85.15; 370/94.3; 340/825.02; 340/825.05
[58] Field of Search ............... 370/16, 16.1, 54, 58.1, 370/58.2, 58.3, 60, 60.1, 85.1, 8.59, 85.11, 85.12, 85.13, 85.14, 85.15, 94.1, 94.3; 340/825.02, 825.05, 825.5, 825.51; 371/11.1, 11.2, 20.1, 20.6

[56] References Cited

U.S. PATENT DOCUMENTS

| | | | |
|---|---|---|---|
| 4,347,498 | 8/1982 | Lee et al. | 340/825.02 |
| 4,380,061 | 4/1983 | Mori et al. | 370/16 |
| 4,460,994 | 7/1984 | Scanlon et al. | 370/85.12 |
| 4,501,021 | 2/1985 | Weiss | 370/85.12 |
| 4,606,022 | 8/1986 | Suzuki et al. | 370/85.1 |
| 4,608,700 | 8/1986 | Kirtley, Jr. et al. | 370/85.11 |
| 4,663,748 | 5/1987 | Karbowiak et al. | 370/85.5 |
| 4,779,261 | 10/1988 | Yamagishi et al. | 370/16 |
| 4,805,168 | 2/1989 | Kato | 370/85.9 |
| 4,858,232 | 8/1989 | Diaz et al. | 370/85.15 |
| 4,899,142 | 2/1990 | Nakayashik | 370/85.15 |
| 4,914,652 | 4/1990 | Nguyen | 370/85.5 |
| 4,937,823 | 6/1990 | Bekki et al. | 370/16.1 |
| 4,951,280 | 8/1990 | McCool et al. | 370/85.12 |
| 5,084,870 | 1/1992 | Hutchison et al. | 370/85.14 |
| 5,101,405 | 3/1992 | Bekki et al. | 370/85.15 |

FOREIGN PATENT DOCUMENTS 3136524 3/1983 Fed. Rep. of Germany.
2608872 6/1988 France.

Primary Examiner—Douglas W. Olms
Assistant Examiner—Alpus H. Hsu
Attorney, Agent, or Firm—Douglas W. Cameron

[57] ABSTRACT

A method and apparatus for transmitting data and control information between a number of stations. This invention has a dual path communications medium with stations either directly connected to the medium or connected to the medium via single path trees. With this invention, data and control information are passed in reverse orders on different paths of the dual paths. Further, data and control information are passed in reverse orders on the single path of a tree connected to the medium.

12 Claims, 7 Drawing Sheets

REVERSE ORDERED CONTROL INFORMATION TRANSMISSION

TECHNICAL FIELD

This invention relates to a method and apparatus for transmitting data and control information in opposite directions on a communications network. More specifically, this invention discloses a method and apparatus for transmitting control information in the opposite direction of data on a network tree configuration having only a single path.

DESCRIPTION OF THE PRIOR ART

For large computer networks, it is advantageous to pass control information in the opposite direction of the data, allowing for a faster communication of control. Passing control information in the opposite direction is particularly useful when the destination of the control is immediately upstream of the sourcing station. This control information can be used for both fault recovery and access protocols. Sending control information upstream for fault recovery is useful since the fault occurs upstream of where it is detected. Sending control information upstream for access protocol is useful to stop an upstream station from transmitting so that the media can be freed for transmission.

Many building and campuses are being configured with fiber optic cable to use FDDI. The FDDI topology is a dual ring of trees topology, illustrated in FIG. 1. In the FDDI topology, a duplex pair of fibers exists between adjacent nodes in the FDDI topology. Typically, in an FDDI topology, single loops of fiber in the trees would extend to individual offices where most attachments would be made. Existing networks that pass control in an upstream direction have a dual parallel path topologies with the control information being passed on the opposite path of the data.

Currently, reverse channel signalling (data and control information being passed in opposite directions) is used in dual bus networks such as IEEE 802.6 standard for Metropolitan Area Networks; however, this standard requires connection to both of the buses and makes no allowance for concentrator trees.

With the increasing prevalence of installed fiber optic cable plants conforming to the FDDI topology rules, tree topology will be the dominant topology. There is, therefore, a need for a method and apparatus where control and data can be passed in opposite directions on networks which have single paths.

German Patent No. 3136-524 issued Sep. 9, 1981 to Bitzinger et al discloses a method for communicating data and control information on separate rings. It does not provide the advantage of routing control information in the opposite direction nor address the routing of the control and data in tree networks.

U.S. Pat. No. 4,380,061 issued Apr. 12, 1983 to Mori et al for "Loop Transmission System with Improved Bypass Routing Arrangement" discloses a dual counter rotating ring communication system, but does not address the routing of control information in the opposite direction.

U.S. Pat. No. 4,460,994 issued Jul. 17, 1984 to Scanlon et al for "Loop Communication System" discloses a loop communication system consisting of dual counter rotating data rings with a central controller. It does not address the communication of control information in the opposite direction nor address the routing of the control and data in tree networks.

U.S. Pat. No. 4,501,021 issued Feb. 19, 1985 to Weiss for "Fiber Optic Data Highway" discloses a loop communication system consisting of dual counter rotating data rings. It does not address the communication of control information in the opposite direction nor address the routing of the control and data in tree networks.

French Patent No. 2608872 issued Jun. 24, 1986 to Goffic and Dorh discloses a system for multiplexing TDMA from a main station to multiple secondary stations. It does not discuss a separate routing of data and control in opposite directions through the secondary stations.

U.S. Pat. No. 4,606,022 issued Aug. 12, 1986 to Suzuki et al for "Data Transmission/Reception Network System" discloses a bus network system with separate control and data. Since it is a common bus, no routing of data and control is discussed.

U.S. Pat. No. 4,608,700 issued Aug. 26, 1986 to Kirtley, Jr. et al for "Serial Multi-Drop Data Link" discloses a bus communication system with separate data and control paths. Thus, the issue of the routing of data and control information is not addressed.

U.S. Pat. No. 4,663,748 issued May 4, 1987 to Karbowiak et al for "Local Area Network" discloses a loop communication system consisting of dual counter rotating data rings. It uses the communication of control information in the same direction as the data.

German Patent 3821636 issued Jan. 5, 1989 to Bekki et al discloses a method for physically attaching stations to the network media. It does not address the routing of the data or control within the station or concentrator.

U.S. Pat. No. 4,805,168 issued Feb. 14, 1989 to Kato for "Local Area Communication Network" discloses a local area network system with separate data and control networks. It does not address the routing of the data and control in opposite directions over the same physical media.

U.S. Pat. No. 4,899,142 issued in 1990 to Nakayashik et al discloses a concentrator design, but does not address the routing of control and data in opposite directions.

SUMMARY OF THE INVENTION

It is an object of this invention to provide a method and apparatus for transmitting control information and data in reverse orders on a single transmission path of a communications network tree configuration.

It is also an object of this invention to provide a mechanism to support higher bit rates and larger extents with faster recovery using existing fiber optic cable plant.

Accordingly, this invention provides for a method and an apparatus for transmitting an information stream having two sets of information between a number of nodes. The nodes are interconnected by a single tree transmission path. This invention also includes a transmitting means transmitting the first set of information in one order on the tree configuration while transmitting the second set of information in the reverse order on the tree configuration. At the same time, the two sets of information are being transmitted on the single path of the tree. In most instances, however, the first and second sets of of information are data and control information respectively.

The reverse order flow of the control and data is achieved through routing the control and data via different inter-port connection paths internal to the nodes. This is accomplished by separating the control and data channels on reception and routing them on different inter-port connection paths. The data and control may then be combined with other data and control as they exit the node.

DESCRIPTION OF THE PREFERRED EMBODIMENT

Figure 1:
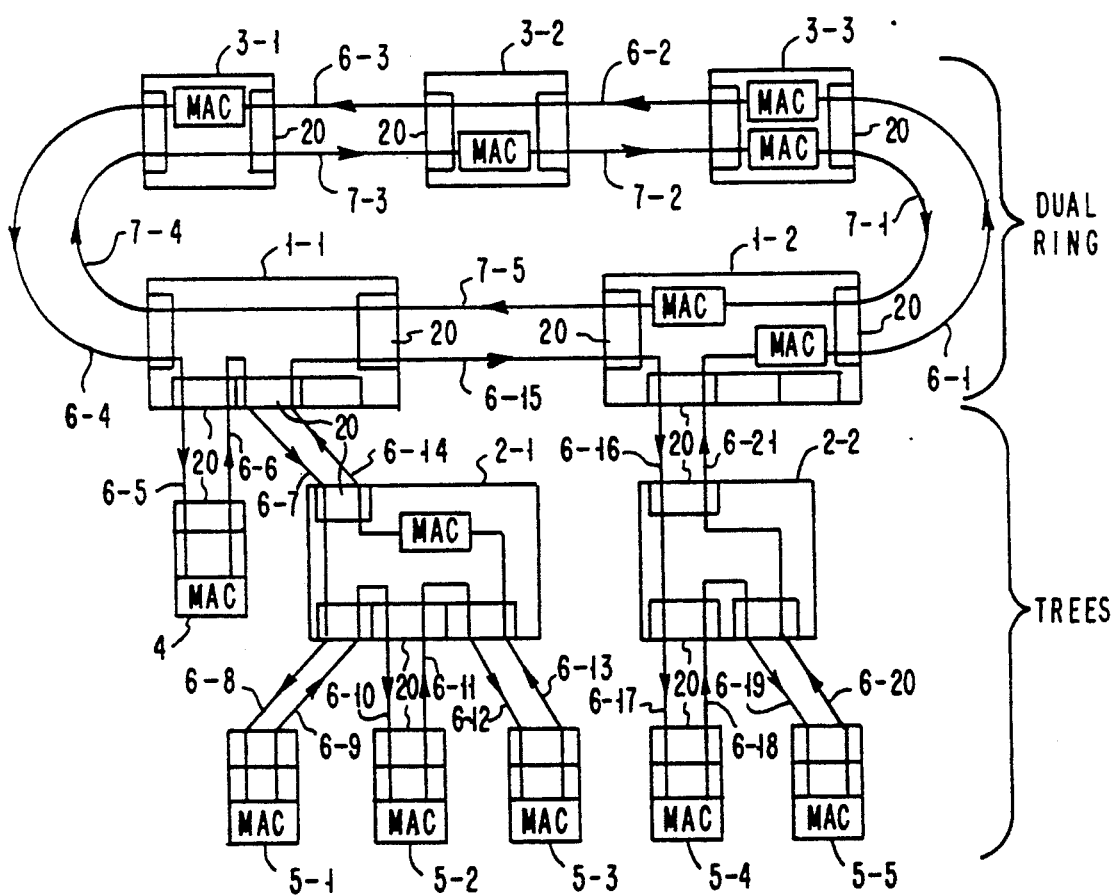
FIG. 1 is a example configuration for a network that operates according to the present invention.

An example physical configuration of a network embodying the present invention is shown in FIG. 1. This network is shown including a number of network nodes: dual attachment concentrators 1-1 and 1-2, single attachment concentrators 2-1 and 2-2, dual attachment stations 3-1 to 3-3, and signal attachment stations 4 and 5-1 to 5-5. Between each pair of neighboring nodes, there exists a duplex connection comprising a pair of links, for example 6-1, 7-1, with the direction of the links indicated by arrows. Physical ports 20 exist in the nodes at each end of each duplex connection.

Dual attachment nodes 1-1, 1-2, and 3-1 through 3-3 are connected directly in the dual ring, while single attachment nodes 2-1, 2-2, 4, and 5-1 through 5-5 are attached in the network trees via concentrators. A single level tree may be constructed using dual attachment concentrators 1-1 or 1-2, and multiple level trees may be constructed with the addition of single attachment concentrators 2-1, 2-2 and attached stations 5-1 through 5-5. Trees with two levels are shown in FIG. 1, but trees of arbitrary levels may be constructed from the nodes shown in FIG. 1.

Media access Controllers (MACs), shown in FIG. 1, originate, receive, and pass data and associated control information on the network. The associated control information may be used for media access or recovery algorithms for the data. Control information originated and received by ports 20 may also be present in the network and is not precluded by this invention. Shown are two paths, the primary path containing links 6-1 to 6-21 and the secondary path containing links 7-1 to 7-5. The dual ring includes the secondary path (links 7-1 through 7-5) and a portion of the primary path (links 6-1 through 6-4, 6-15). Within a tree, there is a single path, 6-7 through 6-14, which may be a path extended from the dual ring as shown or an independent path when no dual ring is present.

Data passes serially through the nodes on each of the primary and secondary paths. This invention routes the associated control information for data on the primary and secondary paths so that control information passes through the same MACs as the data, but in the reverse order. Order refers to the sequence of MACs that the information (data or control) traverses in its course through the network. Reverse order refers to the inversion of the sequence of MACs that the information traverses in its course through the network. The logical ordering sequence for transmission of the data and control information is illustrated in FIGS. 2A and 2B, respectively.

Figure 2A:
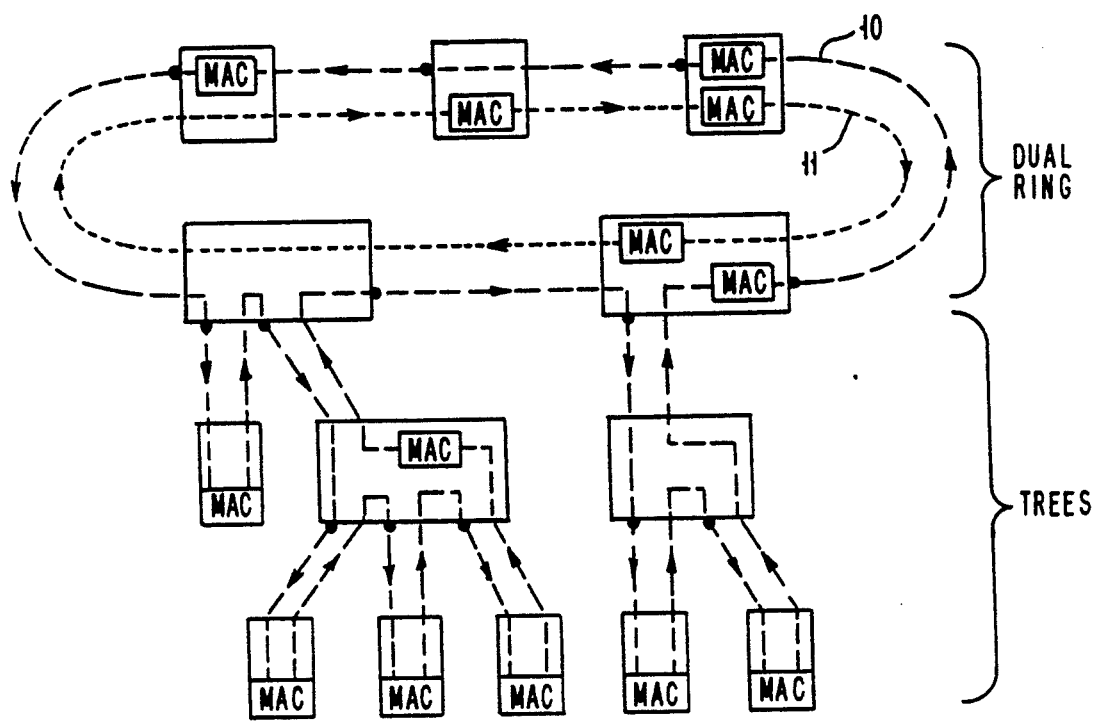
FIGS. 2A and 2B illustrate the ordering followed by the data and control for the physical network of FIG. 1.
Figure 2B:
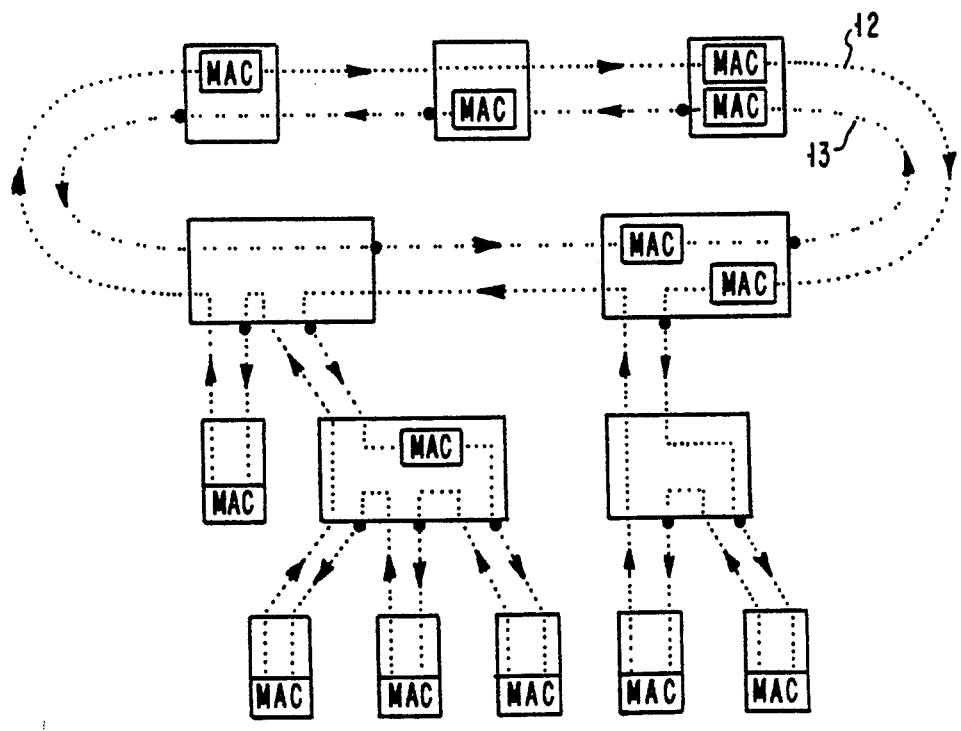

FIG. 2A shows two independent sets of data being transmitted on the primary and secondary paths with the actual inter port connection paths and links between the nodes. 2B shows the two associated set of control information being transmitted. Actual inter-port connections for the control information are shown, however, with the position of the links exchanged for ease of illustration. For example, on the links of the ring (6-1 through 6-4, 6-15, and 7-1 through 7-5) and between any two nodes of the ring data and its associated control information are transmitted on different links. Specifically, between nodes 1-2 and node 3-3 primary path data is transmitted on link 6-1 while the associated control information for the primary path data is transmitted on link 7-1. Note that in FIGS. 2A and 2B, the primary control information 12 for the primary path flows through the MACs in the reverse order of the primary data 10, and likewise for the secondary data 11 and associated secondary control information 13.

Figure 3:
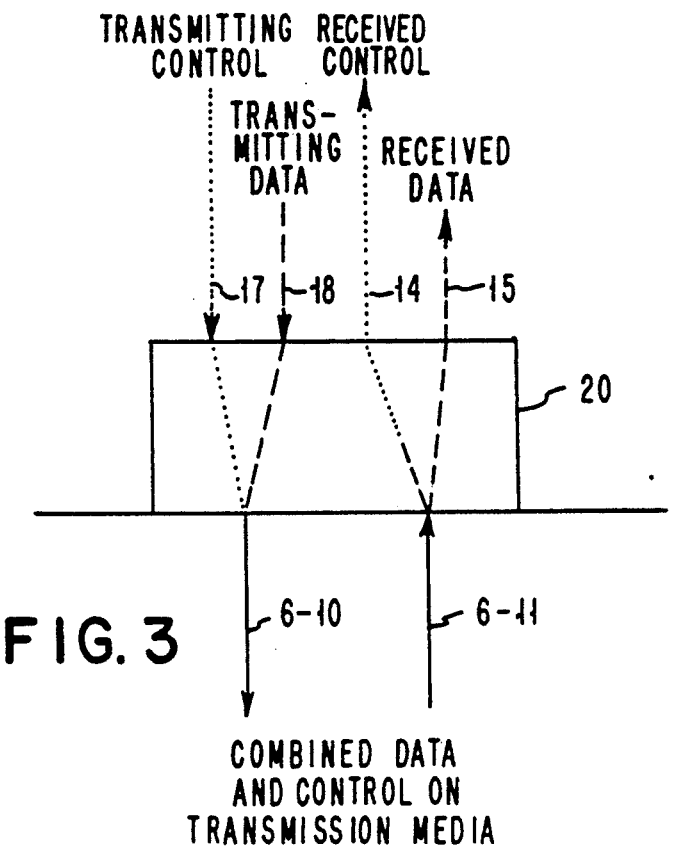
FIG. 3 shows a port that separates the data and control on reception and combines separate control and data on transmission.

As shown in FIG. 3, the basic building block for a network that routes data and associated control information in reverse orders is a port 20 that separates the control information 14 and data 15 from the receiving link 6-11 and combines separate control information 17 and data 18 channels on the transmitting link 6-10.

Figure 4:
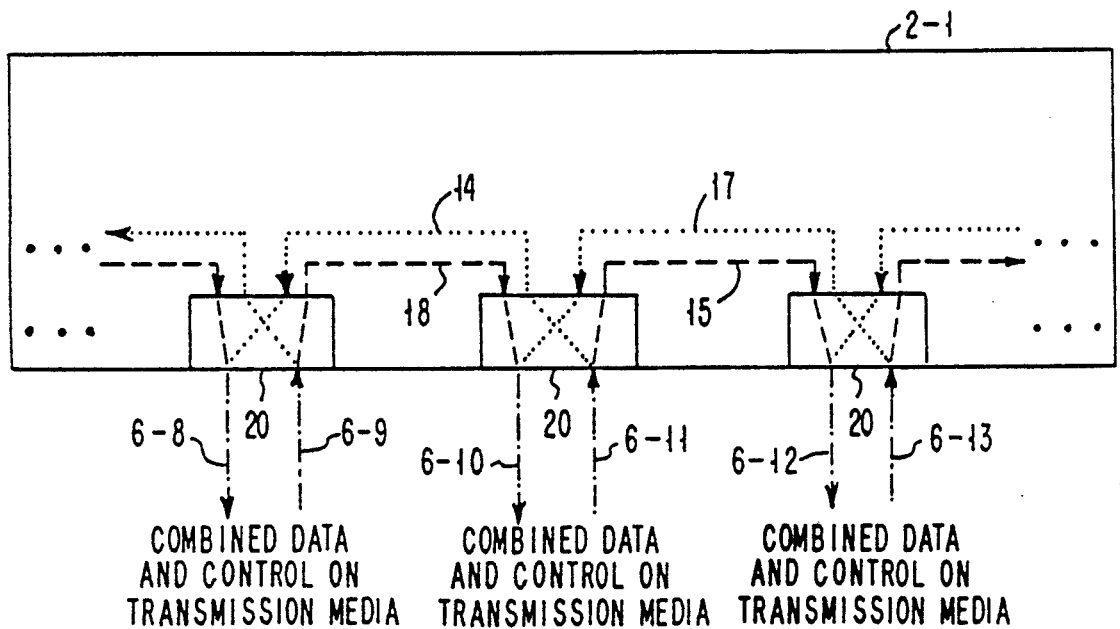
FIG. 4 illustrates the separate passing of data and control information within a node.
Figure 5:
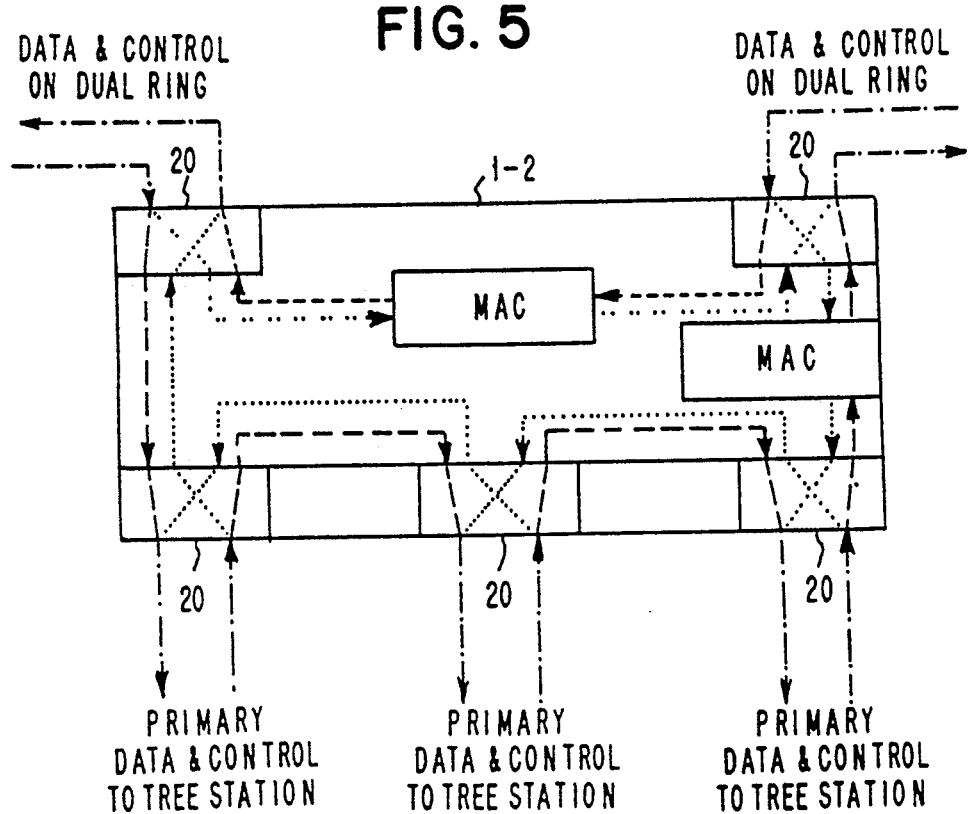
FIG. 5 illustrates the passing of data and control information on inter-port connections in a dual attachment concentrator node.
Figure 6:
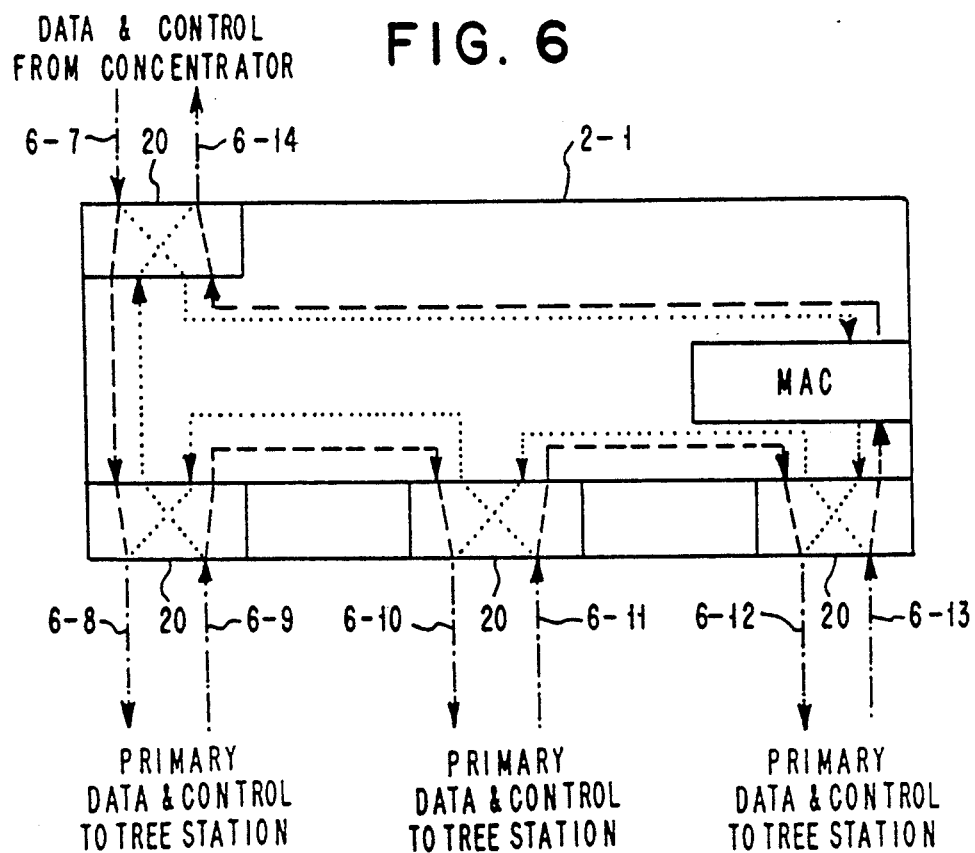
FIG. 6 illustrates the passing of data and control information on inter-port connections in a single attachment concentrator node.
Figure 7:
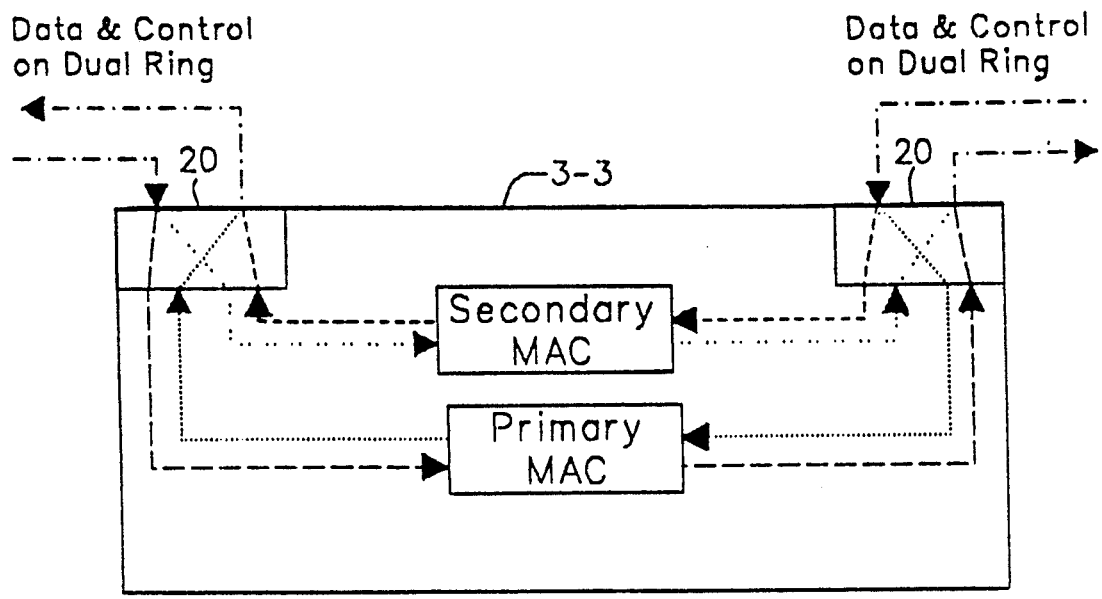
FIG. 7 illustrates the passing of data and control information on inter-port connections in a dual attachment node.
Figure 8:
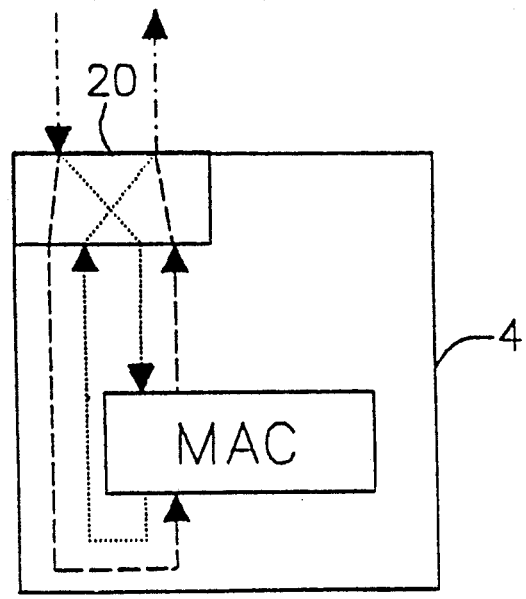
FIG. 8 illustrates the passing of data and control information on inter-port connections in a single attachment node.

A node constructed using such ports is shown in FIG. 4. In FIG. 4, the reverse order control flow is performed by separating the data and control information as it arrives at each port 20 and passing the control information to the left neighbor port 20, while the data is passed to the right neighbor port 20 via inter-port connections. This separation and recombination of the data and control information is accomplished by a node that has separate inter-port connection paths that pass the data and associated control information as shown in FIG. 4. For example, the received information stream 6-11 is separated into control information 14 and data 15, while the transmitted information stream 6-10 is a combination of the control information 17 and data 18 passed from the neighboring ports 20 in the station. Lines 14 to 15 and 17 to 18 can also be used to represent inter-port connection paths. This passing of data and associated control information is shown for a dual attachment concentrator FIG. 5, a single attachment concentrator FIG. 6, a dual attachment station FIG. 7, and a single attachment station FIG. 8. The dotted and dashed lines of FIGS. 5 through 8 interconnecting the ports 20 can also be used to represent inter-port connection paths.

Figure 9:
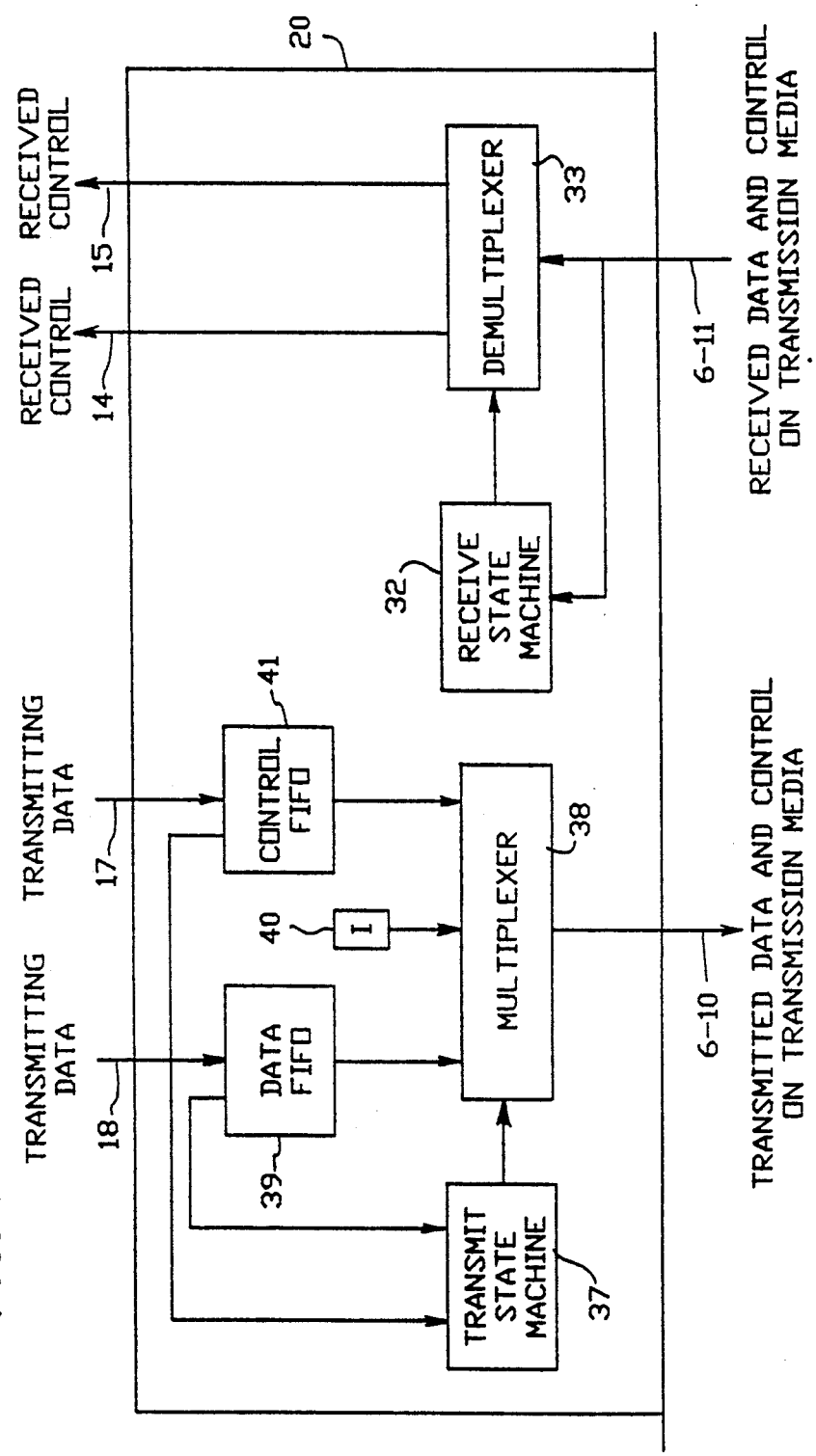
FIG. 9 shows the detailed construction of a port that separates the data and control information on reception and combines separate control and data on transmission.
Figure 10:
FIG. 10 shows an example information stream for the invention.

A detailed diagram of a port is given in FIG. 9. The received data and control information 6-11 is separated at the port according to the information stream (FIG. 10) that arrives at that port. The latter mentioned control information is associated with the data being received for ports within the tree configuration, or is associated with the data being transmitted by ports within the dual ring. The Start Data (SD) delimiter indicates the beginning of the data which is passed out the data inter-port connection path 15 of the port. An End Data (ED) delimiter is received at the end of the data to indicate the end of the data, as opposed to control information. The Start Control (SC) delimiter indicates the beginning of the control information which is passed out the control inter-port connection path 14 of the port. An End Control (EC) delimiter is received at the end of the control information to indicate the end of the control information. Idle (I) symbols occur between control information and data to maintain clock synchronization. Note that Idle (I) symbols occur before the SD and SC in the combined stream. The set of delimiters is SD, ED, SC, and EC.

Figure 11:
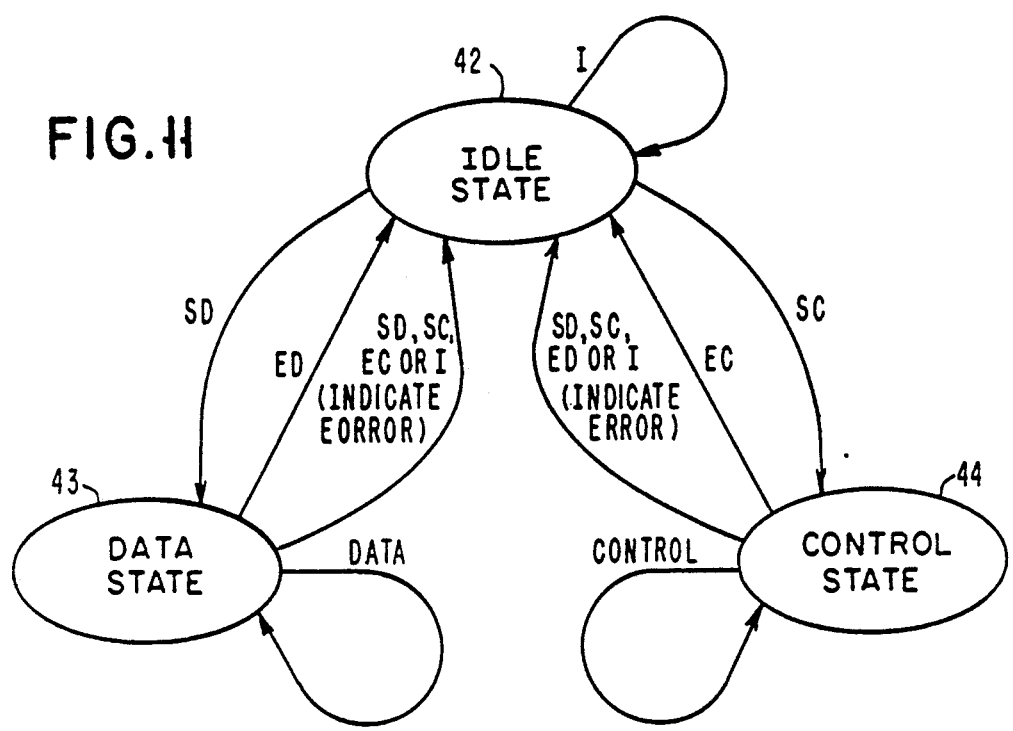
FIG. 11 illustrates the operation of the port receive state machine.

The states of the port receive state machine 32 which controls the demultiplexing 33 of the received information stream are shown in FIG. 11. The receive state machine starts in the Idle state 42 when I symbols are received. Upon the reception of a SD, a transition is made to the Data state 43 where the information stream is passed out the data inter-port connection path 15 of the port. The state machine remains in the Data state until a delimiter (SD, ED, SC, or EC) or I is received and a transition is made to the Idle state. If SD, SC, EC, or I is received while in the Data state, an error is indicated as the transition to the Idle state is made. Upon the reception of an SC in the Idle state, a transition is made to the Control state 44 where the information stream is passed out the control inter-port connection path 14 of the port. The state machine remains in the Control state until a delimiter (SD, ED, SC, or EC) or I is received and a transition is made to the Idle state. If SD, ED, SC, or I is received while in the Control state, an error is indicated as the transition to the Idle state is made.

Figure 12:
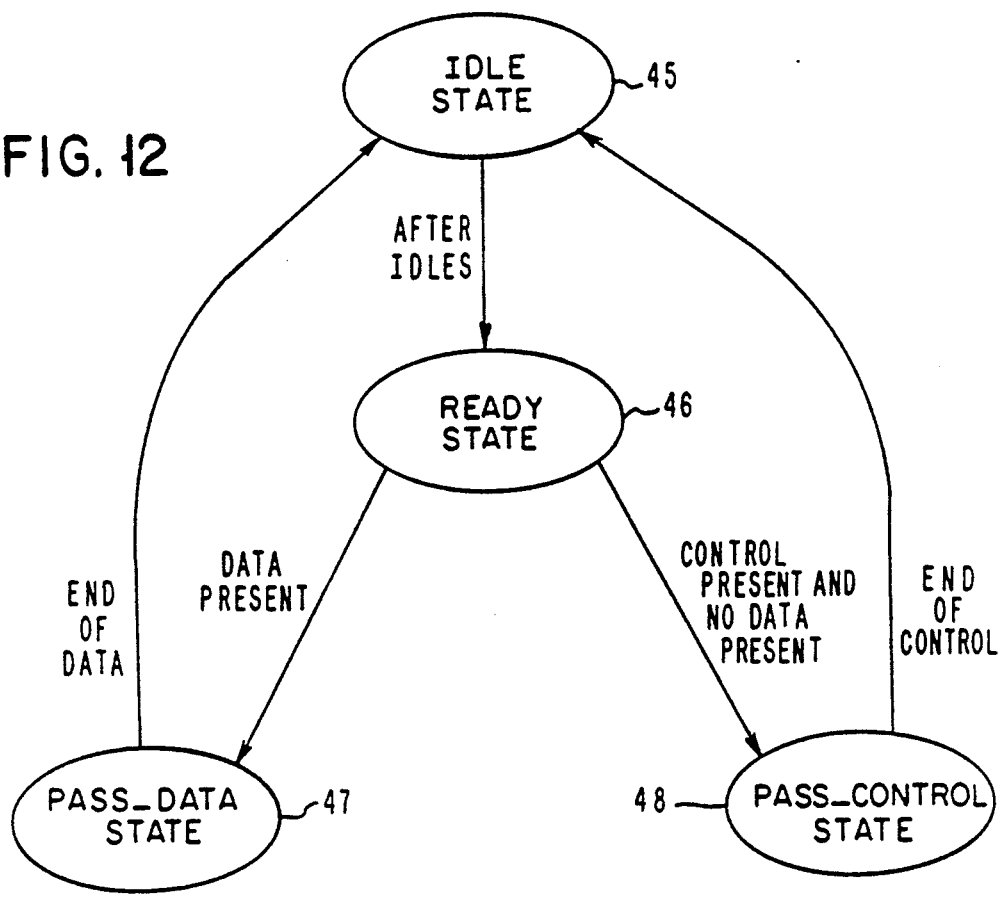
FIG. 12 illustrates the operation of the port transmission state machine.

The data and control information streams are multiplexed upon transmission according to the port transmission state machine shown in FIG. 12. The latter mentioned control information is associated with the data being transmitted for ports within the tree configuration, or is associated with the data being received by ports within the dual ring. In combining the data 18 and control information streams 17, the data stream is given precedence. The transmission state machine starts in the Idle state 45 when no data or control information is present for transmission. While in the Idle state, after a certain number of I symbols 40 have been transmitted, a transition is made to the Ready state 46. If data is present for transmission in the Ready state, a transition is made to the Pass_Data state 47. In the Pass_Data state, the data presented for transmission (18) is transmitted out of the port on the transmission link 6-10. The state machine transitions from the Pass_Data state to the Idle state upon reaching the end of the data. If data is not present for transmission in the Ready state, but control information is present for transmission, a transition is made to the Pass_Control state 48. In the Pass_Control state, the control information presented for transmission (17) is transmitted out of the port on the transmission link 6-10. The state machine transitions from the Pass_Control state to the Idle state upon reaching the end of the control information. FIFOs 41 and 39 are used to buffer the control information or data respectively to prevent loss when data and control information are presented simultaneously.

Having thus described our invention, what we claim as new and desire to secure by Letters Patent is:

1. A communications tree configuration for transmitting an information stream having a first and second set of information, said configuration comprising:
   a) a plurality of nodes;
   b) a single tree transmission path interconnecting said nodes; and
   c) transmitting means for transmitting said first set of information in a first order on said tree configuration and for transmitting said second set of information in a second order on said tree configuration, with said first order being reverse to that of said second order and with said first and second set of information being transmitted on said single tree transmission path.

2. A communication tree configuration for transmitting data and control information associated with said data, said configuration comprising:
   a) a plurality of nodes;
   b) a single tree transmission path interconnecting said nodes; and
   c) transmitting means for transmitting said data in a first order on said tree configuration and for transmitting said control information in a second order on said tree configuration, with said first order being reverse to that of said second order, and with said data and control information being transmitted on said single tree transmission path.

3. A communications tree configuration as recited in claim 2 wherein said transmitting means comprises:
   a) a state machine whose state is a function of whether said data or said control information is being received by a respective one of said nodes of said tree configuration;
   b) means, responsive to said state of said state machine, for separating said data and said control information; and
   c) a pair of inter-port connection paths for interconnecting ports within each of said nodes, with one connection path of said pair passing data in a first direction while another connection path of said pair passes control information for said data in an opposite direction.

4. A communications network comprising:
   a) a plurality of nodes;
   b) a transmission path interconnecting said nodes with a portion of said path forming a tree configuration, with said tree configuration having only a single path which is said portion of said path interconnecting a number of nodes; and
   c) means for transmitting data and control information associated with said data in reverse orders on said tree configuration with said data and said control information being transmitted on said single path of said tree configuration.

5. A communications network comprising:
   a) a plurality of nodes;

b) a pair of network transmission paths with each of said nodes being connected to at least one of said network transmission paths;

c) a tree configuration formed by a portion of one of said network transmission paths and interconnecting a number of said nodes, with said tree configuration having only a single path which is said portion of said one network transmission path;

d) tree transmission means for transmitting data and control information associated with said data in reverse orders on said tree configuration, with said data and said control information being transmitted on said single path and, with said data and said control information being transmitted in the same direction on said single path of said tree configuration; and e) means for transmitting said data and said control information on a part of said network which is not said tree configuration, with said data being transmitted in a first direction on one of said pair of transmission paths and with said control information being transmitted in a second direction on another of said pair of transmission paths, with said second direction being opposite to said first direction.

6. A network as recited in claim 5, wherein said pair of network transmission paths comprises a pair of optical fibers.

7. A network as recited in claim 5, wherein said tree transmission means comprises:

a) a state machine whose state is a function of whether said data or said control information is received by a respective one of said number of nodes of said tree configuration;

b) means, responsive to said state of said state machine, for separating said data and said control information; and c) a pair of inter-port connection paths for interconnecting ports within each node of said number of nodes, with one of said inter-port connection paths carrying said data in a first direction while another of said inter-port connection paths carries said control information in a second direction opposite to said first direction.

8. A communications network comprising:

a) a plurality of nodes;

b) a duplex communications ring having a pair of transmission paths with each of said nodes being connected to said ring;

c) a tree configuration connected to said ring, with said configuration having only a single transmission path interconnecting a number of said nodes;

d) means for transmitting data in one order and control information associated with said data in reverse order on said single path of said tree configuration, with said data and said control information being transmitted in the same direction on said single path of said tree configuration; and e) means for transmitting said data in one direction on one of said pair of transmission paths of said ring and for transmitting said control information in another direction on another of said pair of transmission paths of said ring.

9. In a communications tree configuration for transmitting an information stream having a first and second set of information with said tree configuration having only a single transmission path interconnecting nodes of said tree configuration, a method of transmitting said first and said second set of information, comprising:

a) separating said information stream into said first and said second set of information; and b) transmitting said first set of information in a first order on said tree configuration while transmitting said second set of information in a second order, with said second order being the reverse to that of said first order with said first set and said second set of information being transmitted on said single transmission path.

10. A method as recited in claim 9, wherein said first and said second set of information is data and control information associated with said data, respectively.

11. A method as recited in claim 9 wherein said first and said second set of information are transmitted in the same direction on said single transmission path of said tree configuration.

12. In a duplex communications ring having a pair of transmission paths with at least one tree configuration connected to said ring and with said tree configuration having only a single transmission path, a method of transmitting data and control information associated with said data on said ring comprising:

a) transmitting said data in a first direction on one of said transmission paths of said ring;

b) transmitting said control information in a second direction on another of said transmission paths of said ring, with said second direction being opposite to that of said first direction; and c) transmitting said data and said control information in reverse orders on said tree configuration with said data and said control information being transmitted in the same direction on said single transmission path of said tree configuration.

* * * * *